United States Patent
Ehnebuske et al.

(10) Patent No.: US 8,099,714 B2
(45) Date of Patent: *Jan. 17, 2012

(54) METHOD AND APPARATUS FOR APPLYING BUSINESS RULES IN AN OBJECT MODEL DRIVEN CONTEXT

(75) Inventors: David Lars Ehnebuske, Georgetown, TX (US); Barbara Jane Alspach McKee, Austin, TX (US); Isabelle Marie Catherine Rouvellou, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 1603 days.

This patent is subject to a terminal disclaimer.

(21) Appl. No.: 11/385,466

(22) Filed: Mar. 21, 2006

(65) Prior Publication Data

US 2006/0161891 A1 Jul. 20, 2006

Related U.S. Application Data

(63) Continuation of application No. 09/204,973, filed on Dec. 3, 1998, now Pat. No. 7,017,142.

(51) Int. Cl.
G06F 9/44 (2006.01)
(52) U.S. Cl. .................. 717/117; 717/108; 717/112
(58) Field of Classification Search .................. None
See application file for complete search history.

(56) References Cited

U.S. PATENT DOCUMENTS

| | | | |
|---|---|---|---|
| 5,930,512 A | 7/1999 | Boden et al. | |
| 5,960,200 A | 9/1999 | Eager et al. | |
| 6,074,431 A | 6/2000 | Watanabe et al. | |
| 6,158,044 A | 12/2000 | Tibbets | |
| 6,167,564 A | 12/2000 | Fonatana et al. | |
| 6,526,569 B1 * | 2/2003 | Obin et al. | 717/140 |
| 7,017,142 B1 | 3/2006 | Ehnebuske et al. | |

OTHER PUBLICATIONS

Martin, "Principles of Object Oriented Analysis and Design", Chapters 1-22, published Jun. 1, 1992.
"Using the WFT Development Environment", Template Software Inc., WFT Version 8.0, Chapters 1-9, 1997.
"Developing a WFT Workflow System", Template Software Inc., WFT Version 8.0, Chapters 1-10, 1997.
"Template Software Rolls Out Corporate and Product Growth Strategies at Solutions '97 Conference", PR Newswire, Apr. 3, 1997.
"Template Software Strengthens Core Product Family withease of Use and Functional Enhancements that Promote Unparalleled Software Reuse", PR Newswire Assoc., Jun. 23, 1997.

(Continued)

Primary Examiner — Chuck Kendall
(74) Attorney, Agent, or Firm — Yee & Associates, P.C.; David A. Mims, Jr.

(57) ABSTRACT

A means is provided for specifying, applying, and managing sets of temporary or permanent additions or modifications to the behavior of object-oriented programs without having to change the code of the program, by using externalized rules. The points at which the externalized rules may be applied is determined by the implementation object model, thus making their specification natural to the program developers who are familiar with the program's implementation object model. The concept of dynamic method-based trigger or control points is disclosed for identifying potential rule attachment points in objects and identifying the rules that are applicable to each dynamic control point. At least one control point is flagged on the basis of being active such that the at least one control point and its associated rule is only processed if the at least one control point is flagged as being active.

13 Claims, 5 Drawing Sheets

OTHER PUBLICATIONS

"Using Rational Rose 4.0", Rational Software Corporation, Chapters 1-13, Nov. 1996.

"Rational Rose/C++ Round-Trip Engineering with Rational Rose/C++", Rational Software Corporation, Nov. 1996, pp. 1-227.

Leymann et al., "Business Process Management with FlowMark", IEEE, 1994, pp. 230-233.

"IBM MQSeries WorkFlow", IBM Product description.

Leymann et al., "Workflow-based applications", IBM System Journal vol. 36, No. 1, pp. 1-23, 1997.

McDavid, "Business Language Analysis for Object-Oriented Information Systems", IBM Systems Journal vol. 35, Issue 2, 1996.

Robert, "Business/Enterprise Modeling", IBM Systems Journal, 1990.

Cockburn, "The Impact of Object Orientation on Application Development", IBM Systems Journal, vol. 32, No. 3, 1993.

Saracelli et al., "Process Automation in Software Application Development", IBM Systems Journal, vol. 32, No. 3, 1993.

Dyke et al., "Object-Oriented Programming", IBM Systems Journal, vol. 28, No. 3, 1998.

* cited by examiner

METHOD AND APPARATUS FOR APPLYING BUSINESS RULES IN AN OBJECT MODEL DRIVEN CONTEXT

This application is a continuation of application Ser. No. 09/204,973, filed Dec. 3, 1998, now U.S. Pat. No. 7,017,142 status allowed.

CROSS REFERENCE TO RELATED APPLICATION

The present invention is related to applications entitled "Apparatus and Method for Performing General Integrity Checks Using Integrity Rule Checking Points in an Enterprise Application," U.S. patent application Ser, No. 09/204,971, assigned to the same assignee; "Method And Data Processing System For Specifying And Applying Rules To Classification-Based Decision Points In An Application System," U.S. Pat. No. 6,341,369, issued Jan. 22, 2002, assigned to the same assignee; and "Method and Apparatus for Identifying Applicable Business Rules," U.S. Pat. No. 6,016,477, issued Jan. 18, 2000, assigned to the same assignee and all of which are incorporated herein by reference.

BACKGROUND OF THE INVENTION

1. Technical Field

The present invention relates to executing an enterprise application. More particularly, the present invention relates to executing an object-oriented enterprise application, which includes at least one method, which includes trigger or control points for attaching and running rules.

2. Description of Related Art

Recently, businesses, particularly large enterprises, have moved toward object-oriented programming as a means to make the implementation of their business applications more flexible and adaptable to business environment and business practice changes. While this is a step forward compared to previous art, many businesses are finding that it is necessary to go beyond conventional object-oriented programming to achieve the flexibility and adaptability they require.

One approach to this is to externalize the highly variable business decisions into business rules, which are described and manipulated by business experts instead of developers. Applications entitled "Method And Apparatus For General Integrity Rule Checking Point In An Application," U.S. patent application Ser. No. 09/204,971, filed even date hereof, assigned to the same assignee; and "System and Method And Data Processing System For Specifying And Applying Rules To Classification-Based Decision Points In An Application System" U.S. patent application Ser. No. 09/204,970, filed even date hereof, assigned to the same assignee, are two examples of this approach.

In designing and constructing an application, developers face an analogous problem. They, too, would like to be able to add to or modify the application's behavior without having to change the code of the application, but with a technical rather than business intent. Two examples should suffice to demonstrate this. During the testing phases of development or when problems arise after an application has gone into production, it is often desirable to temporarily add functionality at specific points in the application's implementation object model. The functionality is added to check that particular technical invariants (the date and time of the last update of an object may not be earlier than an operation that it was before it) or constraints (a Person object may have no more than one spouse at any given point in time) imposed by the implementation object model are not being violated. The information can also be recorded internally to the application in a log for later analysis. Similarly, it often arises that it is desirable, particularly in "packaged" applications intended for use in multiple different enterprises, to be able to convert data between a form or forms that are convenient to the various end users and the form or forms used internally by the application.

The prior art cited above describes points of potential rule attachment (the "control points") in business terms, not terms related to the application's implementation object model. Nonetheless, a business rules facility can sometimes be used for developers' technical, as opposed to business, purposes; the added or altered functionality is implemented using the same mechanism used to implement externalized business rules. But doing so has three distinct disadvantages. First, adding technical rules to the business rules can be confusing for the business experts; not all of the rules they see would then be business rules. This makes their work more difficult and error prone. Second, it requires that the application developers recast their technical problem in business terms to discover which, if any, existing business-oriented control points they can use to attach their technical rule. Third, the control points required to make the application flexible to business changes often do not necessarily occur where they need to for technical purposes. It is apparent, therefore, this approach is not adequately adapted for technical use by developers.

Another approach to this problem is to add the required new behavior to the system by using the well-known "Decorator," "Strategy," or "Template Method" patterns as taught by Erich Gamma, et al, "Design Patterns: Elements Of Reusable Object-Oriented Software By Gamma" Addison-Wesley Publishing Company, ISBN 0-201063361-6, pp. 175-179. Use of these techniques has the advantage for the developer of being tied directly to the application's implementation object model. For example, the Decorator pattern, in particular when used in a design that strictly separates object interfaces from object implementations, is often easy to use to cause a decorated object to exhibit arbitrary additional or modified behavior just before or just after any method of the decorated object. But all of these object-oriented coding patterns have the strong disadvantage that the added or altered functionality must be implemented by making programming changes, a more complex and time consuming process than is changing an externally defined rule.

SUMMARY

This invention provides a means for specifying, applying, and managing sets of temporary or permanent additions or modifications to the behavior of object-oriented programs without having to change the code of the program, by using externalized rules. The points at which the externalized rules may be applied is determined by the implementation object model, thus making their specification natural to the program developers who are familiar with the program's implementation object model.

This invention introduces the concept of dynamic method-based trigger or control points as a means for identifying potential rule attachment points in objects and identifying the rules that are applicable to each dynamic control point. A dynamic control point is a specialization of the general control point described in "Method and Apparatus for Identifying Applicable Business Rules," U.S. application Ser. No. 09/993,718, filed Dec. 18, 1997, referenced above, adapted to provide rule attachment points. At least one control point is flagged on the basis of being active such that the at least one control point and its associated rule is only processed if the at least one control point is flagged as being active.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
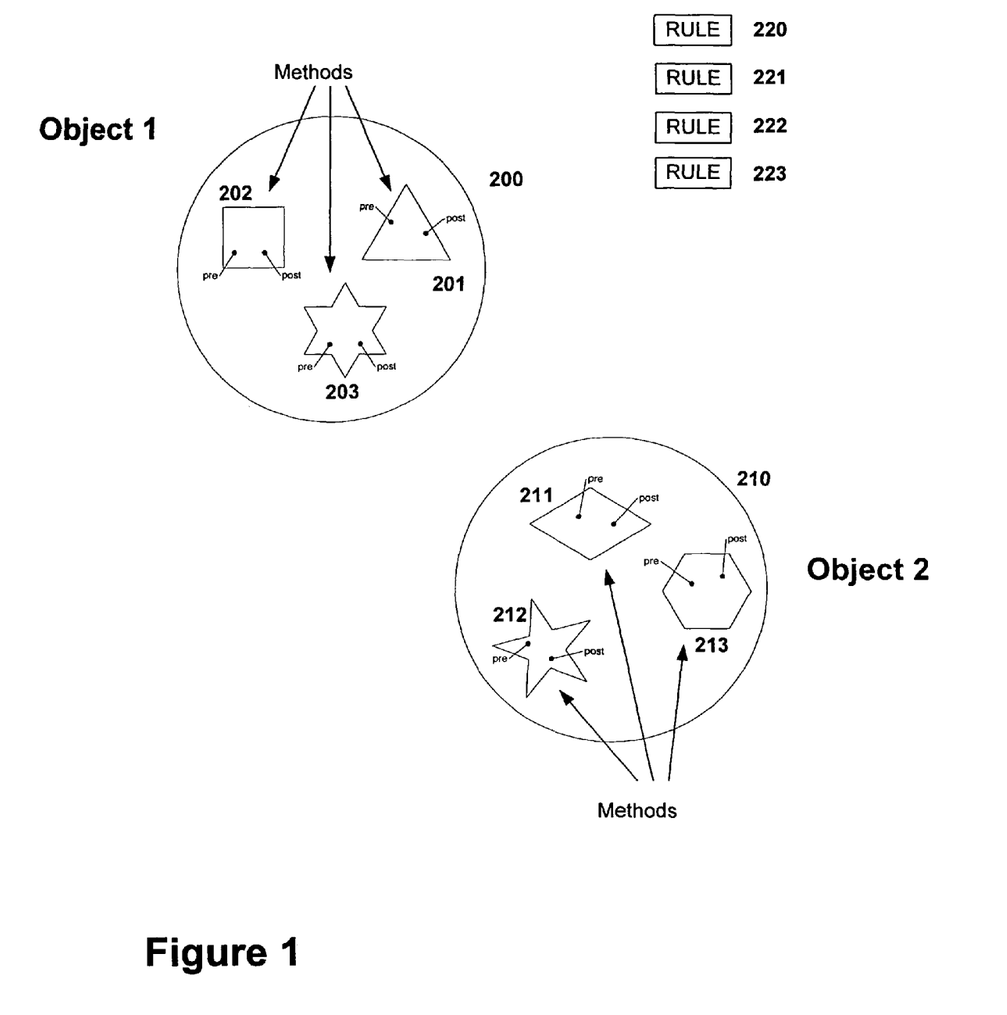
FIG. 1 illustrates the object method context relationship with the external rules.

FIG. 1 illustrates a portion of a typical program's implementation object model. In FIG. 1, two objects are present, 200 and 210. As can be seen from object 200, each object has some non-zero number of methods. In the present invention, each method has two method-type trigger or control points, a pre-method control point and a post-method control point. Each method is limited to exactly two of these control points. In objects of the present invention, each control point may have a plurality of external rules associated with it.

Therefore, in the present invention, an object may have a very large number of methods, the number of method-type control points is always the number of methods within the object times two.

FIG. 1, illustrates software objects (200 and 210) containing a plurality of methods 201 to 203 and 211 to 213 and a set of external rules 220 to 223.

Figure 2:
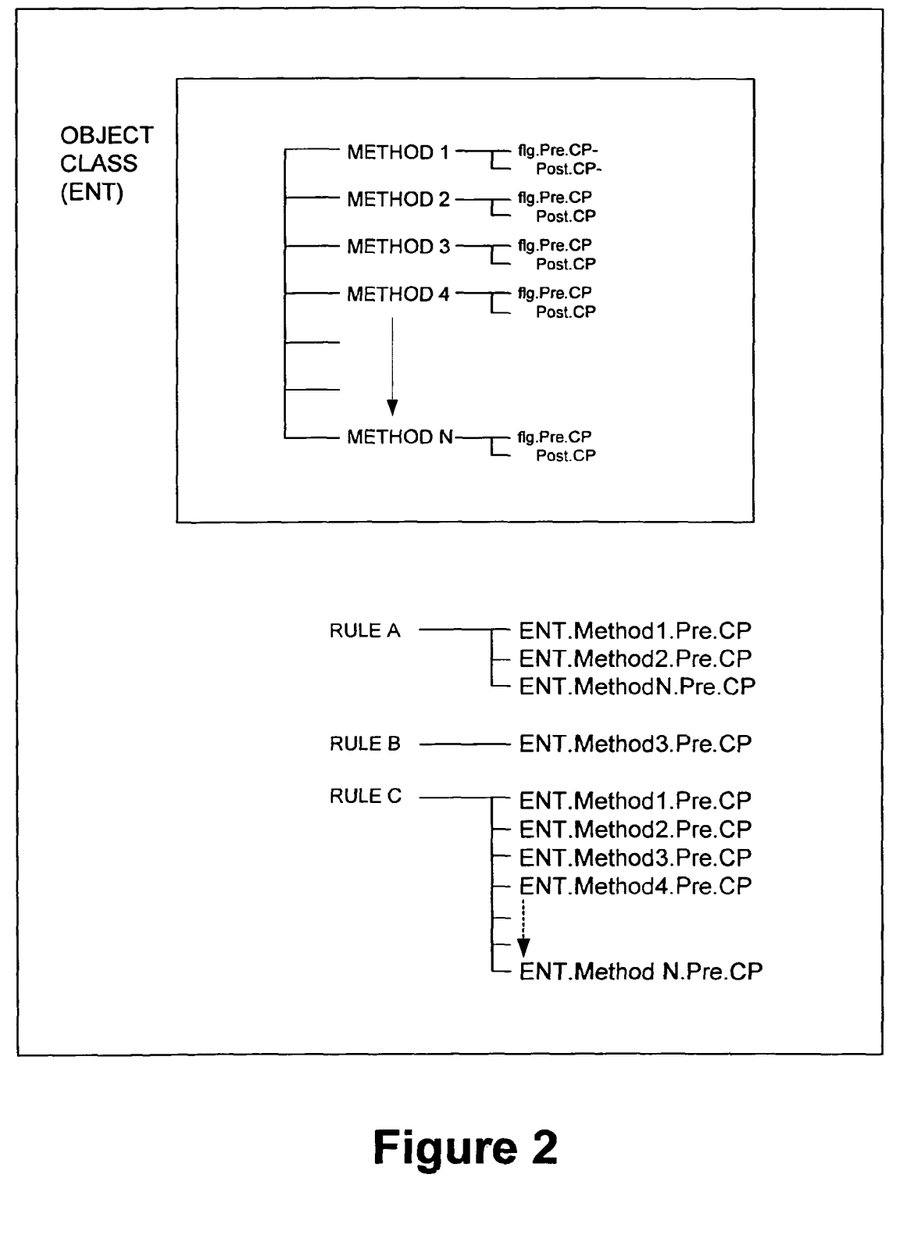
FIG. 2 illustrates an example of rule association to control point context.

FIG. 2 further illustrates the relationship of the method control points to the external rule structure of the present invention. In the present invention, each object class has defined within it a number of methods. Each method has exactly two control points, a pre-method control point and a post-method control point. It can be seen from FIG. 2, objects of class ENT have methods 1-n, that each have a pre- and a post-method control point assigned to them.

Control points assigned to a particular method provide a nexus to the external rules. In FIG. 2, they are exemplified by rules A to C. In the present invention, the developer associates a rule with a method or a context based on technical needs. For instance, method 1 has a pre- and a post-method control point. Looking now at rule A, the developer associates rule A with method 1, method 2 and method N. Still describing rule A, note that each rule has been assigned to a specific control point on each method. For instance, rule A has been associated to ENT method 1, pre-method control point (ENT.Method1.Pre.CP), ENT method 2 pre-method control point (ENT.Method2.Pre.CP), and ENT method N pre-method control point (ENT.MethodN.Pre.CP).

Pre- and post-merely designate that the control point comes before the method in time or after the method in time.

Note also in FIG. 2 that certain control points are flagged, designated in the figure by "flg" next to the flagged control points, while others remain un-flagged. Flagging denotes an active control point. Flagging is a means for a developer or the program itself to identify control points which run any rules associated with them. In certain instances it might be expedient to skip control points that have no rules or control points where the rules are unimportant or unneeded at the current time.

Figure 3:
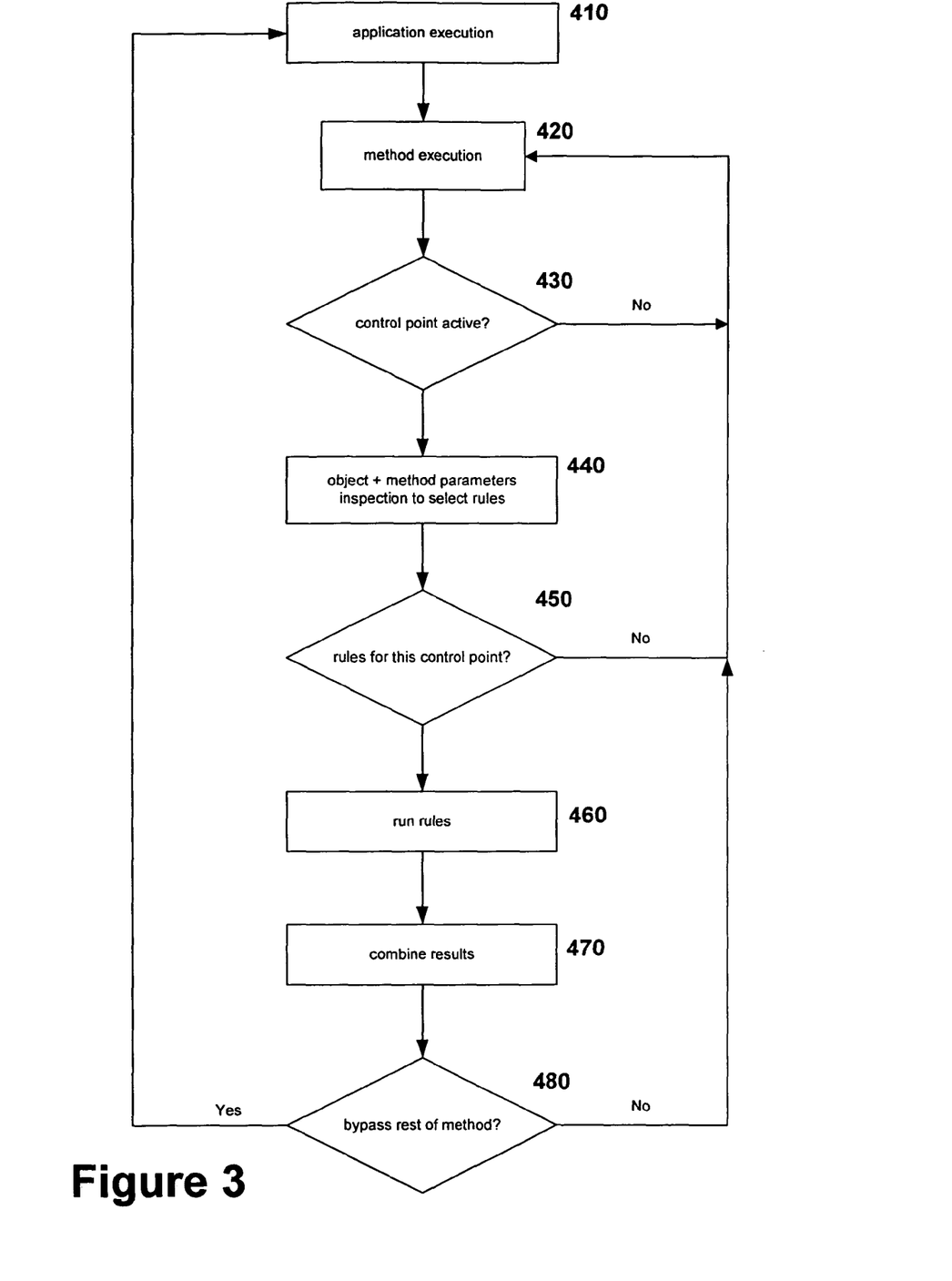
FIG. 3 illustrates a flow chart of the method in the present invention.

FIG. 3 is a flowchart of the method in the present invention. FIG. 3, as in all of the figures, is merely an example of the preferred embodiment of the present invention, and is not meant to limit the scope of the present invention. One of ordinary skill in the art would realize that other implementations of this method are possible.

In step 410 of FIG. 3, an application is executed. The application referred to in step 410 is an object-oriented application, and in particular, is composed of objects. Each object is identified by class. In step 420, a method associated with a particular object is invoked. Invoking a method requires knowing the class of the object and the name of the method being invoked. Just before the logic of the method is executed, the method's pre-method control point is encountered.

Next, in step 430, the flag for this control point is checked to see whether the control point is active or not. If it is not, the method execution proceeds as if there were no control point present. Otherwise control passes to decision box 430.

Decision box 430 is crucial to the present invention. As presently drawn in FIG. 3, decision box 430 merely checks an activation flag to see if the control point is active. If it is active, the flow goes on to step 440 where the object and method names are used to select a rule. However, alternative embodiments are available with respect to decision block 430.

Next, in step 440, the object's class name, method name and the fact that this is a pre-method control pointer are used to find applicable rules, if any. By knowing all possible rules associated with the object class and the method invoked on the object at step 450, the rules for the control point can be selected. However, there may not be any rules associated with this particular control point. In fact, in most cases, rules are probably not assigned. In the present example, if there are no rules for the control point, the method will return to the method execution block 420 to continue the execution of the method as if there had been no control point encountered.

An important feature of the present invention is that different rules can be mapped to different control points. These rules are not exclusive to these control points, but can be used in conjunction with different kinds of control points.

As alluded to above, the types of rules associated with a single control point, of the sort that has been discussed, can perform a variety of different functions. In contrast to the present invention, prior art control points are intended to perform a specific predefined business decision. For this reason, the control points in the present invention are referred to as "method context control points" to distinguish them from the control points of prior art. An advantage of the present invention over prior art is that any method context control point can have a variety of different rules and different types of rules associated with it. The need for these rules can change over time. Although the skill level needed to adapt an object using method context control points requires an understanding of the implementation object model and so is often beyond the skill possessed by business analysts, it requires substantially less skill than required to change the internals of objects.

In a preferred embodiment, a person involved in interpreting implementation object models can associate a plurality of different types of rules to a specific method context control point giving the enterprise the flexibility to invoke situation and time-dependent rules based on the implementation object model considerations rather than the business decision considerations supported by other types of control points.

In step 460, rules associated with the method context control point are executed. Again, the rules associated with a single method context control point can perform a variety of functions. The functions themselves can change over time rather than being set and pre-defined as in prior art rules.

Another important feature of the present invention is that the function of the rules does not necessarily relate to the business enterprise itself. At any control point, a variety of types of rules, having a variety of functions, can be applied. Examples range from merely formatting or mechanical application type rules to rule types implementing exemplary objectives of the business. Any type of rule can be associated at control points and re-associated to other control points and associated to more than one control point.

Finally, in step 470, a combining algorithm is used to combine the results of the rule implementation for each method context control point. This combining algorithm can be different for each method control point.

If the rules assess whether a series of constraints have been passed (which is a common case), each rule will return a boolean telling whether the constraint it checks has passed or failed. In these cases, it is common that the combining algorithm will be a logical 'and' so that the combined result is such that if all of the rules agree that the constraints are passed, the overall result is a 'pass', but if any of the rules determine the constraint it checks for has failed, the combined result is a 'fail'.

In step 480, a determination is made whether the combined result of having run the rules is a decision that the rest of the method invoked in step 420 is to be processed or skipped. Commonly, this decision is taken simply by checking the boolean state of the combined result; if the result is a fail, the rest of the method is skipped. In such cases it is also common that, during this step, an exception is raised so that the normal error handling mechanisms of the application can detect that a constraint has been violated and take appropriate action—for example, telling the application's user or logging the fact of the constraint violation.

If, on the other hand, the decision is that the rest of the method is not to be bypassed, the method's execution is continued. For the common case of a combined result being a boolean stating that the constraints are passed, the execution of the method continues and no result is communicated to the method. If, the combined result is of a different non-boolean type, the combined result is typically made available to the method execution so that it may integrate that value into its processing.

The processing shown in FIG. 3 shows the flow for a pre-method control point. As mentioned in the Summary of the Invention, the present invention also provides for post-method control points which occur just after the logic of the method completes. The flow for these is similar to that shown in FIG. 3 except that processing for post-method control points begins at the completion of the method execution instead of just before it starts.

Figure 4:
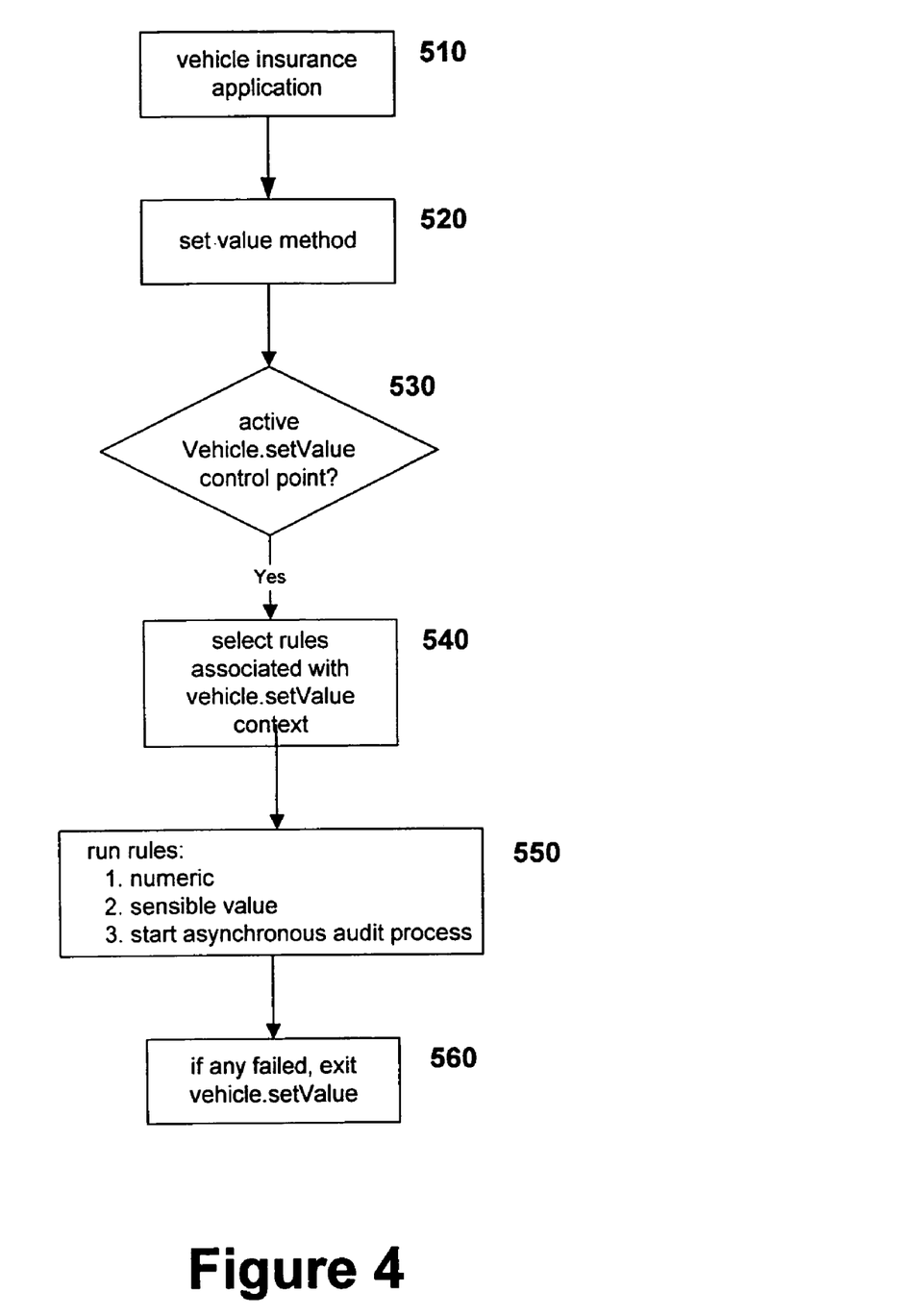
FIG. 4 illustrates a flow chart example of the method in the present invention.

FIG. 4 illustrates a specific example of the implementation of the process of the present invention. While many possible business models are available, one might include a process for assigning a value of a vehicle for insurance purposes. In step 510, the vehicle insurance application is invoked. In the business object model there is a vehicle business object. In assigning an estimated value for a vehicle, certain rules are necessary to validate the estimate. Examples of such rules include checking the estimate based on age, make, model, or the trust the organization has in the person doing the estimating. Which rules are found varies over time. In step 520, assigning a value to a vehicle includes executing a 'set value' method. At this point/a dollar amount for the vehicle value must be entered. Proper format for the value would be a dollar amount in some number of digits, for instance, $10,000.00. In step 530, the process determines if a control point associated with the vehicle.setValue context is active.

In step 530, a determination is made whether this pre-method control point is active. In the current example, it is, and thus the flow proceeds to step 540. Control points associated with rules other than testing rules are generally not deactivated, but may be for special purposes. To improve performance, control points which are known a prior to be associated with no rules may be deactivated.

Since the control point is active, the process moves into step 540 where rules associated with vehicle.setValue pre-method control point are selected. Once again these rules are chosen because they have been associated with this vehicle.setvalue method context control point. As noted several times above, over time, different rules could be associated with the control points as needs change. In other words, using the method context control point process, a fixed point of variability is identified for placement of the rules without any consideration as to whether the rules will actually apply, or if they do apply, what their function might be.

In the preferred embodiment, each method has exactly two trigger points or control points, a pre-method and a post-method control point. Because the control points are regularly placed with respect to implementation object models—just before and just after each method—those familiar with an application's implementation object model will immediately understand where, during application execution, rules may be placed to modify the behavior of the application. Further, they may do so without modifying the application's internal code.

Step 540 performs the same function as steps 440 and 450 of the preceding figure. In this step, the rules are found which are associated with the vehicle.setValue pre-method control point.

One of the important features of this invention is that the types of rules available for selection are very diverse. These types of rules not only include business rules, but also include functional and maintenance rules. In the present example, the rules are run (step 550). Three types of example rules are given: a mechanical check which assesses the entry itself, a business type rule which determines if the entry value is sensible, and a third type of rule, which is completely unrelated to the other two rule types.

The method being executed in the present example saves the value of the vehicle. So, if the user inputs a vehicle value amount of some number at step 520, say $10,000, one possible rule to be applied would be to ask if the input itself is formatted correctly to be usable. A numerical value would be mechanically correct, whereas some other entry, such as a text entry, would not fit the format expected for a vehicle value, and would be rejected. The rule would fail.

Many rules associated with the pre-method control point are merely means to validate entries and format. Rule 1 in block 550 is an example. If rule 1 fails, the process would flow through to step 560, and exit the method without saving the new value. However, other types of rules do more than merely check entries for mechanical condition. Specific business function rules, such as whether or not the entry is sensible, are also possible rule types.

In the preferred embodiment, another possibility is that the rule will call up data from the object such as year, make, model, and condition of the vehicle, and compare a calculated value against the value entered initially. Rule 2 in block 550 is an example of such a business type rule. If the value is sensible, the program proceeds on.

There are still other types of rules that have no direct correlation to the value itself, but are important to the business or process as a whole. A third type of rule (step 550) may start an asynchronous audit process. This process may run independently of the other two rules being implemented. Examples of these might be to check the account for instances of fraud in the past. This rule may initiate a completely different sequence of events prescribed by other entities within the business itself.

A rule for auditing the method would probably be associated with a post-method context. The results of the post-method rule might point to changes needed in the rules or needed in implementation of the rules to ensure that the rules validate the method.

Another possible rule, which has very little to do with the value of the vehicle itself, but may be important to the insurance company, would be to provide the policy holder making the claim with other information pertaining to other products available from the company. So, for instance, if a claim against a vehicle is being concluded and a check for the full value is being cut, a rule might cause particular literature on home, health, and other policies the insurance company offers to be inserted in the envelope with the check.

Figure 5:
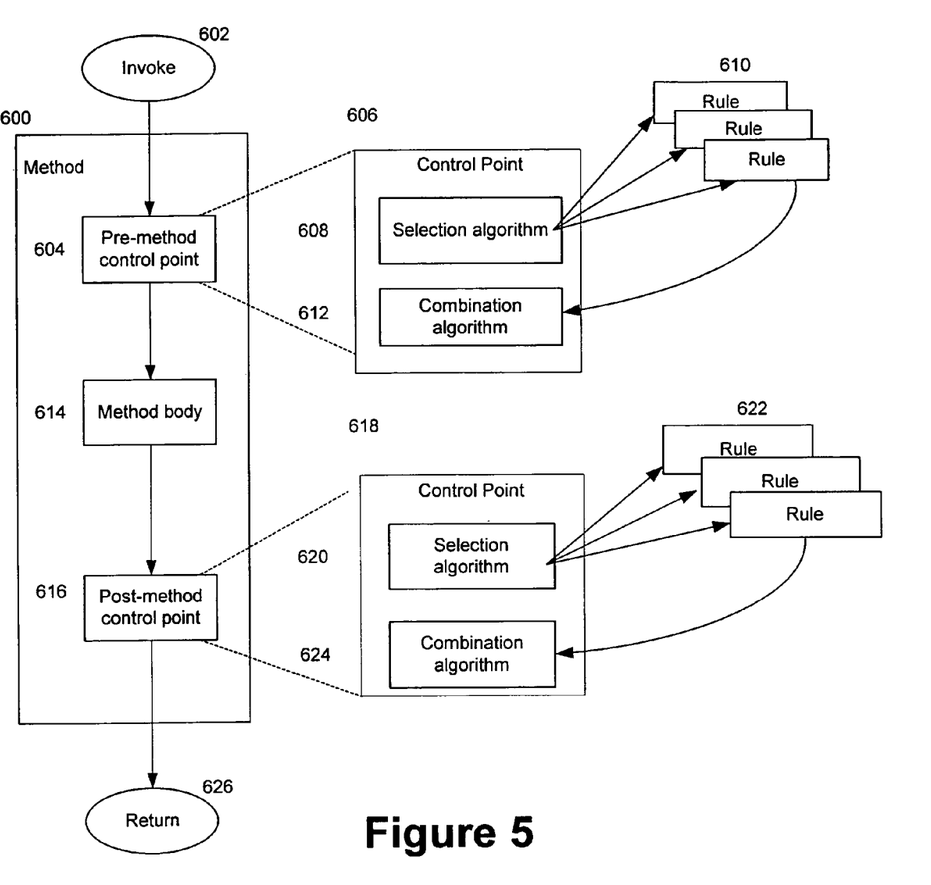
FIG. 5 illustrates the relationship between objects and their pre-method and post-method control points and to the rules associated with them.

FIG. 5 illustrates how methods in objects relate to their pre-method and post-method control points, and to the rules associated with them by showing a representative example. Each object has a number of methods. FIG. 5 illustrates one such method (step 600). During the course of program execution, when the method is invoked (step 602), execution encounters a pre-method control point (step 604). This control point is shown in expanded form (step 606).

The control point uses its selection algorithm (step 608) to select the relevant set of rules (step 610) based on the class of the object, the name of the method, and the fact that the control point is a pre-method control point. It then fires the rules one by one, passing each rule a reference to the object of which this method is a part, and the parameters that the method was passed when it was invoked.

Each rule calculates its result so that after firing the rules, the control point has a set of rule-firing results, which it combines into a single result using its combining algorithm (step 612). The combining algorithm may differ from control point to control point depending on the needs of the situation. Frequently, if the rules return boolean results, it will simply carry out a 'logical and' or 'logical or' of the rule-firing results. The combining algorithm decides, based on the combined result, whether to continue by executing the method body (step 614), or to bypass method body execution and return (step 626).

If the combining algorithm decides to continue with method body execution, it must also decide whether to make the combined result available to the method body. Frequently, if the combined result is a boolean value, it does not, but if the combined result is of some other data type, it does. If the combining algorithm decides that execution is to bypass the method body execution, it may optionally (and usually does) throw an exception so that the invoker of the method can detect that the method has not been executed due to a rule-based decision.

Assuming that the method body is to be executed, control flows into it at step 614. After the method body is executed, the post-method control point is encountered (steps 616 and 618). The post-method control point operates in much the same way that the pre-method control point does, including rule selection (step 620), rule firing (step 622), and results combining (step 624). The major difference is that, because the method body has already been executed, the rule combination algorithm's options for dealing with the combined result are largely limited to throwing an exception.

Whether or not the method body is executed and whether or not an exception is thrown, in the end the method returns (step 624) to its invoker.

What is claimed is:

1. A process implemented by a computer for defining an object, comprising steps performed by the computer of:
    defining an object;
    defining a method in the object by:
    defining method logic;
    placing the method logic in the method;
    defining at least one control point, wherein the at least one control point has a rule associated therewith, and the rule is external to the method;
    placing the at least one control point in the method wherein the method logic is continuous; and flagging the at least one control point on the basis of being active such that the at least one control point and its associated rule is only processed if the at least one control point is flagged as being active.

2. A process for defining an object as in claim 1, wherein the step of placing the at least one control point further comprises placing the at least one control in the method before the method logic.

3. A process for defining an object as in claim 1, wherein the step of placing the at least one control point further comprises placing the at least one control point in the method after the method logic.

4. A process implemented by a computer for defining an object, comprising steps performed by the computer of:
    defining an object;
    defining a method in the object by:
    defining method logic;
    placing the method logic in the method;
    defining at least one control point; and
    placing the at least one control point in the method wherein the method logic is continuous, wherein the at least one control point comprises two control points and further comprises:
    placing a first control point in the method before the method logic;
    placing a second control point in the method after the method logic;and flagging the at least one control point on the basis of being active such that the at least one control point and its associated rule is only processed if the at least one control point is flagged as being active.

5. A process for defining an object as in claim 1, wherein the step of defining the at least one control point further comprises:
    defining a rule selection algorithm associated with the at least one control point, wherein the rule selection algorithm is used to determine which of a plurality of rules are to be processed when the at least one control point is encountered.

6. A process implemented by a computer for defining an object, comprising steps performed by the computer of:
    defining an object;
    defining a method in the object by:
    defining method logic;
    placing the method logic in the method;

defining at least one control point;

placing the at least one control point in the method wherein the method logic is continuous; and flagging the at least one control point on the basis of being active such that the at least one control point and its associated rule is only processed if the at least one control point is flagged as being active, wherein the step of defining the at least one control point further comprises:

defining a rule result combination algorithm associated with the at least one control point.

7. A process for defining an object as in claim 6, wherein the step of defining the at least one control point further comprises:

defining a rule selection algorithm associated with the at least one control point, wherein the rule selection algorithm is used to determine which of a plurality of rules are to processed when the at least one control point is encountered.

8. A process for defining an object as in claim 1, wherein the method has an entry point that is called to invoke the method logic in the method.

9. A process for defining an object as in claim 1, wherein the rule is processed to determine whether or not execute the method logic.

10. A process for defining an object as in claim 1, wherein a given control point of the at least one control point has a plurality of different rules associated therewith.

11. A process for defining an object as in claim 1, wherein multiple methods re defined in the object, with each method of the multiple methods having an associated control point with corresponding rule to form multiple associated control points and multiple corresponding rules, wherein a given corresponding rule of the multiple corresponding rules is associated with a plurality of the multiple associated control points.

12. An apparatus comprising a data processor coupled to a memory and operable to execute instructions in the memory to perform the steps of claim 1.

13. A apparatus for defining an object, comprising:

means for defining an object; means for defining a method in the object by:

means for defining method logic; means for placing the method logic in the method; means for defining at least one control point, wherein the at least one control point has a rule associated therewith, and the rule is external to the method; means for placing the at least one control point in the method wherein the method logic is continuous and means for flagging the at least one control point on the basis of being active such that the at least one control point and its associated rule is only processed if the at least one control point is flagged as being active.

* * * * *